(12) United States Patent
Lewis et al.

(10) Patent No.: US 7,783,887 B2
(45) Date of Patent: Aug. 24, 2010

(54) METHOD AND APPARATUS FOR PROVIDING TELEVISION SERVICES USING AN AUTHENTICATING TELEVISION RECEIVER DEVICE

(75) Inventors: David Otto Lewis, Rochester, MN (US); Jeffrey Earl Remfert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1244 days.

(21) Appl. No.: 11/321,602

(22) Filed: Dec. 29, 2005

(65) Prior Publication Data

US 2006/0107057 A1    May 18, 2006

Related U.S. Application Data

(62) Division of application No. 09/884,636, filed on Jun. 19, 2001, now Pat. No. 7,000,115.

(51) Int. Cl.
*H04L 9/32* (2006.01)

(52) U.S. Cl. .................. 713/176; 713/169; 380/277; 380/270

(58) Field of Classification Search ................ 713/169, 713/176
See application file for complete search history.

(56) References Cited

U.S. PATENT DOCUMENTS

| | | | |
|---|---|---|---|
| 4,868,877 A | 9/1989 | Fischer | |
| 5,351,302 A | 9/1994 | Leighton et al. | |
| 5,495,098 A | 2/1996 | Pailles et al. | |
| 5,606,609 A | 2/1997 | Houser et al. | |
| 5,724,425 A | 3/1998 | Chang et al. | |
| 5,734,819 A | 3/1998 | Lewis | |
| 5,875,248 A | 2/1999 | Lewis | |
| 5,910,989 A | 6/1999 | Naccache | |
| 6,035,303 A | 3/2000 | Baer et al. | |

(Continued)

FOREIGN PATENT DOCUMENTS

JP    8328470    12/1996

(Continued)

OTHER PUBLICATIONS

IBM Corp., "High Integrity Distributed Configuration Management", IBM Technical Disclosure Bulletin, vol. 37, No. 9, Sep. 1994, pp. 453-457.

(Continued)

*Primary Examiner*—Kimyen Vu
*Assistant Examiner*—Yogesh Paliwal
(74) *Attorney, Agent, or Firm*—Roy W. Truelson

(57) ABSTRACT

A smart chip protection system contains a unique public/private identity key pair and uses a separate public/private signature key pair. The internally stored identity private key can not be read outside the chip. An issuing entity generates a descriptor containing the identity public key, attribute data, and a digital signature of the two, using a signature private key known only to the issuer. The authenticity of the descriptor is verified by decrypting the signature using the signature public key, and comparing the result to source data. An object's identity can be verified by requesting the smart chip to perform a data transformation using its identity private key, and performing the complement using the public key. An exemplary embodiment is a television receiver system which verifies identity of an embedded smart chip and entitlement to receive television service.

18 Claims, 11 Drawing Sheets

U.S. PATENT DOCUMENTS

| | | | |
|---|---|---|---|
| 6,198,996 | B1 | 3/2001 | Berstis |
| 6,308,270 | B1 | 10/2001 | Guthery |
| 6,463,155 | B1 * | 10/2002 | Akiyama et al. ............ 380/278 |
| 2002/0013940 | A1 * | 1/2002 | Tsukamoto et al. ............ 725/5 |
| 2002/0018569 | A1 | 2/2002 | Panjwani et al. |

OTHER PUBLICATIONS

IBM Corp., "Public-Key Enciphering/Deciphering Transformations Using a Conventional Algorithm", IBM Technical Disclosure Bulletin, vol. 25, No. 3A, Aug. 1982, pp. 1241-1249.

* cited by examiner

METHOD AND APPARATUS FOR PROVIDING TELEVISION SERVICES USING AN AUTHENTICATING TELEVISION RECEIVER DEVICE

CROSS REFERENCE TO RELATED APPLICATIONS

This is a divisional application of U.S. patent application Ser. No. 09/884,636, filed Jun. 19, 2001, entitled "METHOD AND APPARATUS FOR UNIQUELY AND AUTHORITATIVELY IDENTIFYING TANGIBLE OBJECTS", now issued as U.S. Pat. No. 7,000,115, which is herein incorporated by reference.

This application is also related to the following commonly assigned co-pending applications, filed on the same date as the present application, all of which are herein incorporated by reference:

Ser. No. 11/321,604, filed Dec. 29, 2005, entitled "METHOD AND APPARATUS FOR UNIQUELY AND AUTHORITATIVELY IDENTIFYING TANGIBLE OBJECTS".

Ser. No. 11/321,605, filed Dec. 29, 2005, entitled "METHOD AND APPARATUS FOR PROVIDING CELLULAR TELEPHONE SERVICE USING AN AUTHENTICATING CELLULAR TELEPHONE DEVICE"; and Ser. No. 11/321,606, filed Dec. 29, 2005, entitled "CELLULAR TELEPHONE DEVICE HAVING AUTHENTICATING CAPABILITY".

FIELD OF THE INVENTION

The present invention relates to digital data processing devices, and in particular to identification and authentication using digital data processing technology.

BACKGROUND OF THE INVENTION

In some far distant past era, the rights of people over property were protected by a community, which both recognized its individual members and what belonged to them, either individually or collectively, as part of the common knowledge of the community itself. As the world became more complex, more populous, and more impersonal, these ancient forms of property protection became impractical, and forms more appropriate to the needs of changing societies were developed. At some point, the number of individuals in a community, or the number of sheep, goats, or other items of property, multiplied to where it was difficult for the unaided memory to keep track of the various property relations. Man therefore conceived a method of identifying property to aid the memory, and to discourage interlopers: he branded each animal with a mark which was unique to the animal's owner.

From this primitive beginning, a great variety of techniques for protecting property relationships has developed. For example, recording systems, typically maintained by some governmental agency, have been used to record property relationships; serial numbers have been embedded in manufactured goods; special techniques have been used for printing currency, which makes it difficult to counterfeit; and code words or passwords have been used to limit access to physical areas or information. The list is almost endless.

In general, each new development in the art of identification and authentication is responsive to some perceived threat to existing relationships. As those who would infringe the rights of others become increasingly more sophisticated in their techniques, it is necessary to develop improved protection mechanisms. In other words, an "arms race" of sorts exists, in which the stability of the social order depends on continuing improvement in property protection methods and systems.

The complexity of the modern world has gone beyond the need to identify and authenticate items of property. The identity of an individual himself, once the common knowledge of a community, and later established by the memory of a subset of individual members of the community, is now usually established by reference to an identity document, such as a driver's license or passport. But like any other tangible object, an identity document can be stolen, copied, altered, or counterfeited. Thus, the same problems involved in identifying and authenticating a tangible object are now present in the case of identifying individuals as well.

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, the declining prices and expanding capabilities of computers and other digital technology cause them to be used in new and varied applications.

The development of digital computers and related digital data devices has dramatically increased the scope of the aforementioned arms race. The range of property to be protected, tangible and intangible, has greatly increased at the same time that digital technology provides imaginative new capabilities to infringers. On the other hand, digital technology opens up vast potential resources for property protection, which have as yet been tapped to only a small degree.

Property protection has various aspects, among them being identification and authentication. These concepts overlap to a considerable degree, but it is useful to bear in mind the different purposes of identification and authentication. Identification refers to techniques whereby some object is distinguished from other similar objects, often for purposes of establishing ownership of the object in question. Identification is often unique, i.e., an identification associated with an object is unique in the universe of objects of the same type. However, identification need not necessarily be unique. Authentication refers to techniques for establishing that the attributes of an object are real and have not been forged. Both of these concepts may be applied to the identities and attributes of individuals as well as objects. For example, is an individual really who he claims to be (a question of identification), and does he have authority to perform some action (a question of authorization).

Many conventional techniques exist which use digital data devices for purpose of identification and/or authorization. For example, serial numbers can be encoded in read-only memory devices, or device attributes can be stored in on-line servers. The use of so-called smart cards is an outstanding example of digital technology employed as both an identification and authorization device (in this case, usually for an individual). But many gaps or shortcomings exist in protection mechanisms using conventional identification and/or authorization techniques.

One recurring problem with conventional techniques is a design trade-off between security and freedom of action. Naturally, key data should be protected from unauthorized copying or alteration, and sometimes from unauthorized observation as well. Conceptually, such data can be made secure if it is unalterable and unreadable. Unfortunately, such a requirement places impractical restrictions on the use of the data. There is usually a need to read data for various purposes, and often a need to alter it under controlled circumstances. There are many ways in the digital world to alter data, but any capability to alter data opens the door to the possibility that unscrupulous parties will do just that to their own advantage.

A need exists for improved techniques for property protection, and in particular, improved techniques for using digital data technology to identify and authenticate tangible objects (including documents used for the purpose of identifying/authenticating individuals).

SUMMARY OF THE INVENTION

A protected tangible object includes a digital data protection system having a small processor with the capability to decode data using a public/private key encryption algorithm, and a permanent, secure storage accessible only through the processor. The digital data protection system is herein referred to as a "smart chip", it being understood that it is not necessarily required that all protection system elements be contained on a single chip. A substantially unique public and private identity key pair are generated according to such an encryption algorithm, the identity private key being stored in the permanent, secure storage such that it can not be read outside the chip. The identity of the protection system is verified by performing a data transformation of test data according to the public/private key encryption algorithm using the identity public key, by requesting the protection system to perform a complementary transformation using the identity private key, and comparing twice transformed data with original data.

It is possible to use the identity public key directly as an identifier or index to additional information, but in the preferred embodiment, an issuing entity generates a descriptor, the descriptor containing the identity public key, attribute data concerning the object (or person, if the object is intended as an identifying document), and a digital signature. In this preferred embodiment, the digital signature is generated by enciphering ("signing") a derivation of the identity public key and the attribute data according to a public/private key encryption algorithm (which may or may not be the same algorithm as used for the identity public/private key pair), using a signature private key and a signature public key pair (these being different from the identity public/private key pair). The signature private key is known only to the issuing entity, and is not stored on the smart chip.

In the preferred embodiment, the descriptor data is stored in a storage area on the smart chip itself, from which it is read out at the request of any requesting device. Thus, the descriptor data itself is not intended to be protected from being read. Alternatively, it is possible to store a reference to at least some of the descriptor data on the smart chip, the reference being used to access a data location on a separate medium. In this case, the smart chip may contain only the reference, or may contain some of the descriptor data along with the reference. As a further alternative, the descriptor data may be stored on a separate storage area on the protected object, but external to the smart chip. The choice of alternative may depend on the application, the volume of descriptor data, and other factors.

The authenticity of the descriptor data can be verified by applying the signature public key to the digital signature using the decryption algorithm, and comparing the result to the appropriate derivation of the descriptor data. The identity of the object can be verified by encrypting a random number with the public identity key, requesting the smart chip to decipher it and return the deciphered value using its identity private key, and comparing the returned value to the original random number. Alternatively, the identity of the object can be verified by requesting the smart chip to encrypt a random number using its identity private key, decrypting the encrypted random number using the identity public key, and comparing the decrypted value with the original random number.

In the preferred embodiment, the digital signature is generated by creating a hash of all data bits in the identity public key and attribute data portions of the descriptor, using any of various known hash algorithms, such as SHA-1 or MD5. This hash will change if any bits are modified in the original data. The hash is then encrypted using the signature private key.

It is preferred that the issuer of the smart chip maintain no record of the identity private keys it creates, and that the private keys be stored only in the smart chips themselves. If it is desirable to maintain a record of identifiers and owners, it is sufficient to record the identity public key and owner data in a database. In this manner, even if the issuer's security is compromised, the identity private keys remain secret, making duplication of previously issued smart chips nearly impossible.

The use of identity and signature keys as described herein are intended to prevent unauthorized copying or alteration of the attribute data, and do not necessarily prevent reading of the data. In many applications, it is desirable that the attribute data be in plain text to facilitate reading, and this may be done consistent with the present invention. In other applications, it may be desirable to restrict visibility of the attribute data, in which case the attribute data itself may be encrypted according to any of various encryption algorithms, also consistent with the present invention.

The preferred embodiment of the present invention thus achieves a significant level of security while permitting an issuing entity to easily update the attributes of a protected object. The descriptor data can be easily accessed, but it can not be readily used without the smart chip for which it is intended, and can not be readily altered without the private signature key in the hands of the issuing entity. Updating descriptor data can be accomplished by transmitting the old descriptor to the issuing entity, deriving the public identity key from the old descriptor, modifying the attribute data, generating a new digital signature using the new data and the private signature key, and transmitting the new descriptor back to the user. It will be observed that this process does not necessarily require any level of security during transmission, so transmission may be accomplished over the Internet or any other readily available means.

In an exemplary use, the smart chip is embedded in a satellite television receiving system. The smart chip stores what is effectively a unique identifier for the system (i.e., the identity private/public key pair). The descriptor stored in the smart chip includes attribute data identifying the television broadcasts which the user is entitled to receive, and may include the descrambling keys needed to receive the broadcasts. An on-board digital controller in the satellite receiver system obtains the descriptor from the smart chip, uses the signature public key to verify that the descriptor data has not been altered, and uses the identity public key to verify that the descriptor data belongs with the physical smart chip within the receiver system (thus preventing some unscrupulous person from merely copying a valid descriptor from a different smart chip). If the customer wishes to change his viewing options, the issuing entity can easily generate another descriptor as described above.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Public/Private Key Encryption Overview

Figure 1:
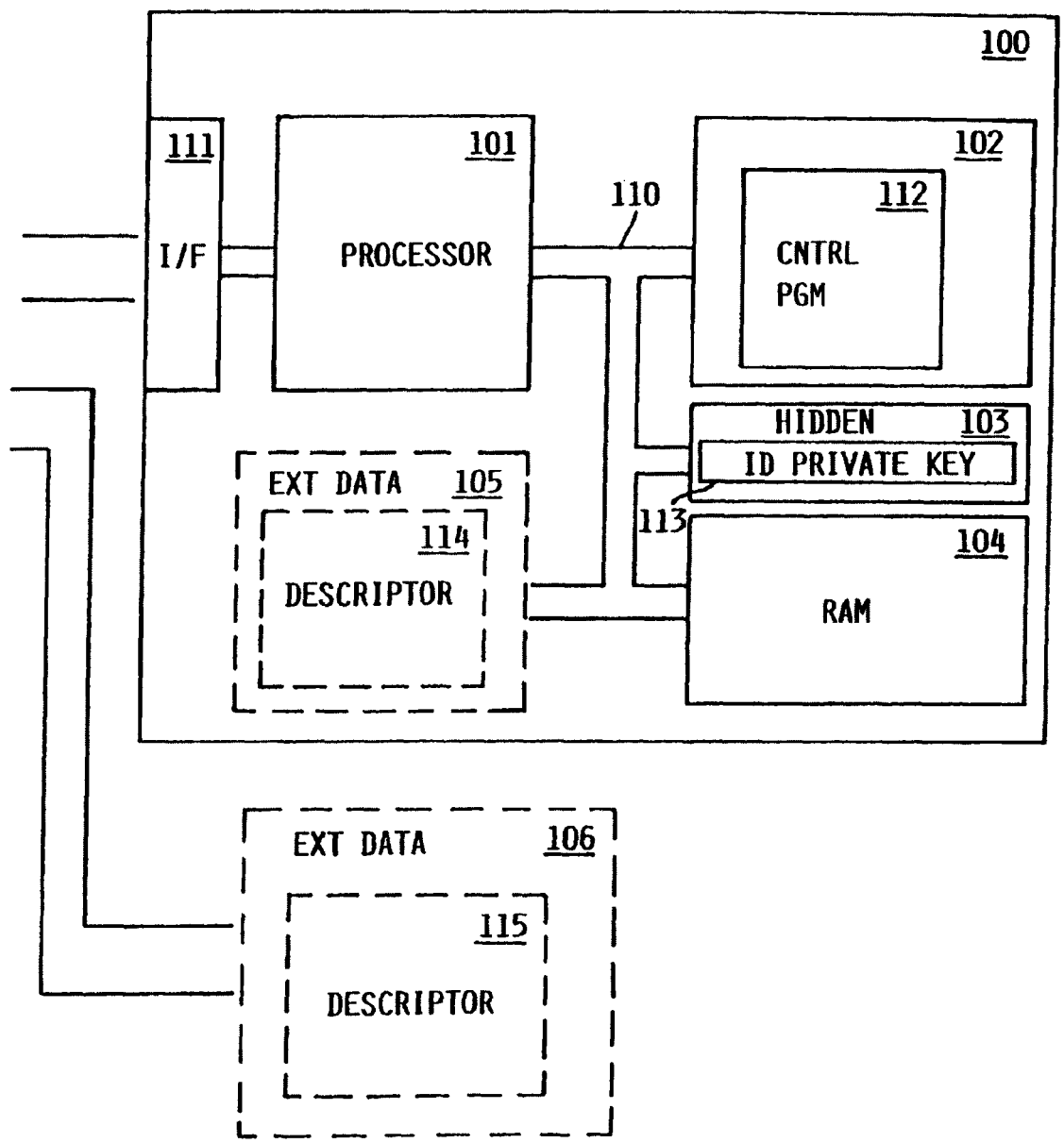
FIG. 1 is a high-level block diagram of a smart chip for use in identifying or authenticating a tangible object, according to the preferred embodiment of the present invention.

In accordance with the present invention, one or more public/private key encryption algorithms are used. Various such algorithms exist today and are known in the art. Any such algorithm or algorithms, now known or hereafter developed, could be used consistent with the present invention, the exact choice of algorithm depending on various design considerations.

These algorithms have the characteristic that they perform a one-way data transformation using a key. By "one-way" it is meant that it is not algorithmically feasible to perform a reverse data transformation to obtain the original data, having only the transformed data and the key used to construct it. However, it is possible to perform a reverse data transformation with a second key. The two keys therefore form a pair, with which it is possible to perform a complete transformation and reverse transformation of data.

The one-way nature of the data transformations necessarily implies that it is not algorithmically feasible to obtain one key from the other, for if it were, it would be possible to perform the reverse data transformation by simply generating the other key. However, since there must be a way to generate the two keys initially a further characteristic of a public/private key encryption algorithm is that it is possible to algorithmically generate a pair of keys. The key generation algorithm itself requires some input data (a seed), so that it will not always generate the same key pair. Typically, this is accomplished by seeding a key generation algorithm with a random number.

Public/private key encryption algorithms are commonly used to encrypt and decrypt data (including encryption keys for data) being transmitted over or stored in an unsecure medium. For most data of significant size, it is common to encrypt the data using a fast algorithm, such as DES, which provides more efficient transformation than public/private key encryption, and to encrypt/decrypt only the encryption key for the fast algorithm using a public/private key encryption algorithm. In this environment, the initial transformation is an encryption of the data, and the reverse transformation a decryption. The key used to encrypt the data is called a public key, because it need not be protected, and multiple copies of it can be distributed. A person in possession of the public key can only encrypt, and can not decrypt, data. The private key is available only to persons having a need to decrypt the data, usually a single person. Thus, almost anyone might be able to generate an encrypted version of some data, but only the holder of the private key can read such data.

These algorithms can, however, be used in a different mode, in which the private key is used to generate the encrypted version of the data, while the public key is used to decrypt it. Obviously, such a usage is not intended to protect the data from being read, since anyone with the public key can decrypt and read the data. This usage is intended to authenticate data. The encrypted version of the data is referred to as a digital signature, and it normally accompanies a plain text version of the data to authenticate the plain text version. Since only the originator of the data has the private key, only the originator can generate an encrypted version, i.e., generate a digital signature. By performing the reverse transformation (decryption) with the public key and comparing the decrypted data to the plain text version, anyone can verify that the plain text version is the same as what the originator had encrypted in the digital signature. Thus data is protected from alteration, as opposed to access, by third parties. Unless the data being authenticated by a digital signature is very brief, it is common to generate a digital signature from a hashing of the data, since an encryption of the entire data may result in unreasonably large digital signatures.

As used above, "algorithmically feasible" refers to the capability to perform an act (in this case, a data transformation) using a known algorithm which is guaranteed to, or which will in general, complete in a reasonable time. In the mathematical sense, it is possible to perform the reverse transformation by systematically generating every possible combination of original data, transforming it with the original key, and comparing the result to the transformed data, until a match is found. However, for most encrypted transformations of even a relatively small amount of data, it can readily be demonstrated that the fastest computers available today would take longer than the projected age of the universe to complete such a task, and hence this approach can not be said to be "algorithmically feasible". Similarly, it may be possible with substantial effort under certain circumstances to perform a reverse transformation using heuristics, if it is known or guessed that certain patterns exist in the original data. No encryption algorithm can claim to forever defeat the ingenuity of potential codebreakers, but encryption techniques can make it enormously difficult to get at protected information, so difficult that the cost of doing so typically outweighs the potential benefits.

General Description of the Preferred Embodiments

Referring to the Drawing, wherein like numbers denote like parts throughout the several views, FIG. 1 is a high-level block diagram of a smart chip 100 for use in identifying or authenticating a tangible object, according to the preferred embodiment. Smart chip 100 is preferably implemented as an integrated circuit on a single "chip" substrate. As shown in FIG. 1, smart chip 100 comprises a programmable processor 101, a non-volatile program memory 102, a non-volatile internal hidden memory 103, and a general purpose memory 104, all of which are coupled to an internal bus 110 for transferring data between the memories and the processor. Smart chip 100 may optionally contain a non-volatile external data memory 105, also coupled to bus 110. Processor 101 is coupled to an external interface 111 for receiving and transmitting data to and from the chip. It will be observed that the memories are preferably arranged so that external data communications always pass through processor 101; while this arrangement is not necessarily the most efficient for transferring large volumes of data, it is normally expected that the volume of data crossing the external interface 111 is low, and this arrangement provides some level of security from unauthorized access to data in the memories.

Processor 101 is preferably a simple programmable general-purpose processor, which executes a set of instructions of a control program to control the operation of smart chip 100. Because smart chip 100 is not expected to be used for large scale intensive data processing like a general-purpose digital computer, processor 101 may be slower, have a more limited instruction set, number of I/O lines, registers, etc., than a typical central processing unit found in a general purpose computer. Program memory 102 contains the executable instructions which form the control program 112 executing in processor 101. Program memory 102 must be non-volatile, i.e., the contents must be maintained in the absence of power to smart chip 100. Since it is not expected that control program 112 will be altered, and is in fact preferred that the program can not be altered, program memory 102 is preferably permanently encoded with data at manufacture, and thereafter acts as a non-writable read-only memory.

Hidden memory 103 is used for storing the identity private key 113, the use of which is explained in greater detail herein. Hidden memory must also be non-volatile. Memory 103 is called hidden because one requirement of the memory is that it the contents can not be read outside smart chip 100. Since processor 101 needs to access hidden memory 103 for certain operations, control program 112 is responsible for enforcing this restriction. Hidden memory 103 is not necessarily physically constructed as read-only memory, and could be, e.g., a flash memory. Depending on the application, it may be possible to write to hidden memory externally, as long as one can never read hidden memory externally. In practice, smart chip 100 may be mass-produced by permanently forming the same control program 112 in program memories 102 of all smart chips of a given model, and subsequently inserting individual identity private keys 113 into the hidden memories by sending a predetermined series of special commands to the smart chip. It may be desirable to prevent subsequent alteration of the hidden memory. This may be accomplished, e.g., by severing a fusible link needed to program the memory after the same has been programmed with a value. However, in most applications it is believed that no security exposure exists from the ability of anyone to write a new private key to the smart chip as long as the existing private key can not be read, because the data descriptor containing the original identity public key is signed with a signature private key which is unknown outside the issuer, and changing the identity private key will invalidate the descriptor.

General purpose memory 104 is a read/write random access memory (RAM) used by processor 101 to store temporary values while performing operations. It is not necessary that general purpose memory 104 be non-volatile.

External data memory 105 is an optional non-volatile memory used for storing data available to be read externally. In particular, external data memory 105 may be used to store descriptor data 114, i.e., an identity public key, attribute data, and a digital signature, as more fully explained herein. For reasons which will be explained below, it is not necessary to prevent descriptor data from being read externally. Therefore, in a further alternative embodiment, descriptor data 115 could be stored in an external data memory 106 located outside smart chip 100. External data memory 105 could alternatively store a portion of the descriptor data, and/or could store an index to a location containing the descriptor data, the remaining descriptor data being stored in another memory location. Memory 105 may store additional data to be read externally. External data memory 105 and/or 106, whichever is utilized, is preferably a read/write memory to allow updating of data. It is expected that in most applications data will be updated infrequently, and therefore a memory technology which allows only a limited number of write operations is acceptable.

FIG. 1 shows four different memory modules within smart chip 100. However, it should be understood that FIG. 1 is intended as a conceptual representation for purposes of showing the different functional parts of memory in smart chip 101. In fact, some of the memories shown in FIG. 1 might be combined in a single memory structure, the different modules shown in FIG. 1 being merely different address locations in the memory structure.

The present invention may utilize any of various smart chip implementations known in the art. For example, chips of the AT90SC family by Atmel Corporation may be used, it being understood that this represents but one example of various alternative smart chip design, now existing or hereafter developed, which may be used.

In general, a tangible object protected by a smart chip in accordance with the present invention may be a non-electronic device to which the smart chip is attached, or may itself be a digital electronic device in which the smart chip is embedded. These two general implementations are illustrated at a high level as FIGS. 2A and 2B, respectively.

Figure 2A:
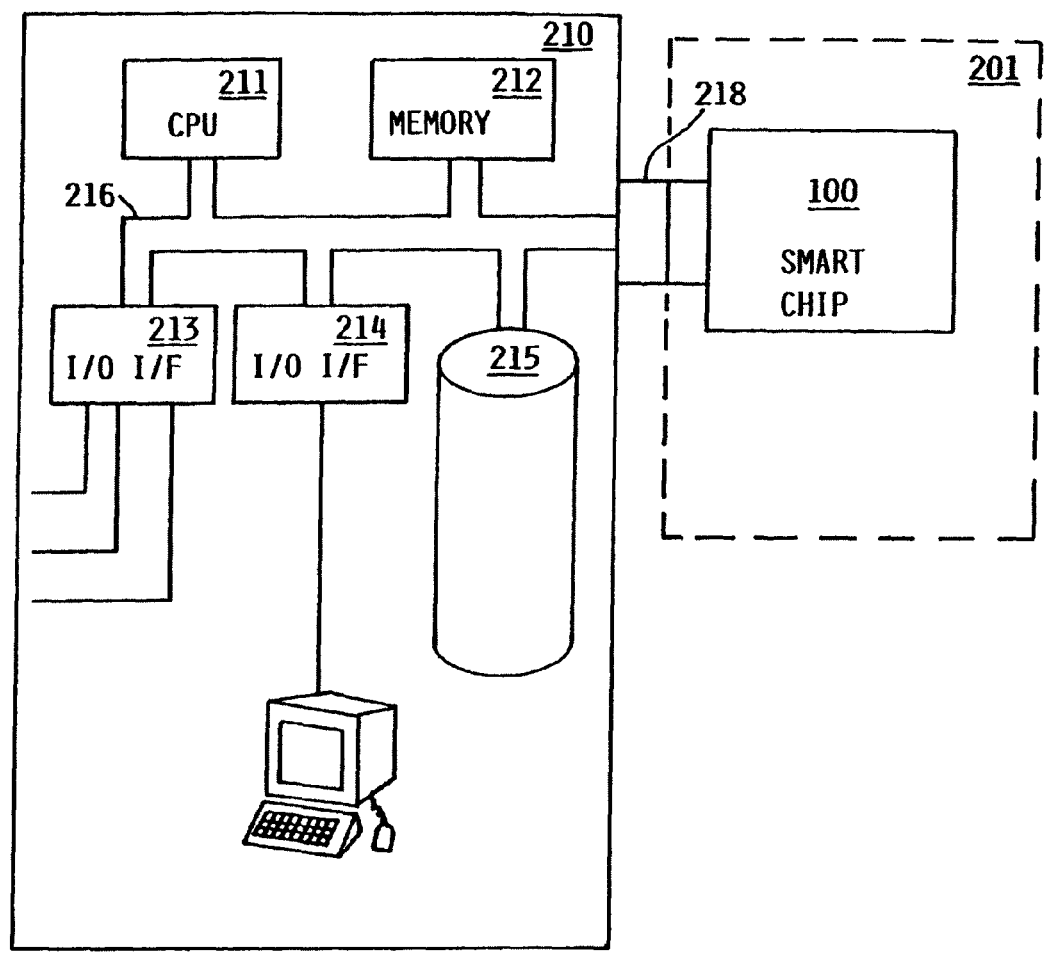
FIGS. 2A and 2B are high-level illustrations of two alternative general environments for using a smart chip, according to the preferred embodiment.

As shown in FIG. 2A, smart chip 100 is attached to tangible object 201. In this variation, tangible object 201 is itself a non-electronic object, i.e., it contains no digital electronic logic or power which is coupled to chip 100. Example of such non-electronic objects are passports, bank charge cards, certain automobile parts, etc. The smart chip is intended to be plugged into a coupling 218 of a digital electronic device 210 in order to be used. The digital electronic device may e.g., comprise a processor 211, a random access memory 212, input/output interfaces 213-214 for handling input and output through terminals, printers, networks, etc., data storage such as a rotating magnetic disk drive 215, and a communications bus 216 for communicating data among the various components. In this configuration, smart chip 100 receives power and communicates data through coupling 218. Smart chip 100 may be plugged into coupling 218 on a transient basis (e.g., in the case of a tangible object 201 which is a passport which is verified at a passport control station), or may be plugged into coupling 218 on a more or less continuous basis (e.g., in the case of an automotive part which is plugged into an on-board central control computer of an automobile).

Although a physical coupling which is capable of transmitting electrical power as well as data is shown in FIG. 2A, it will be appreciated that other forms of data interface would be possible, particularly if the tangible object includes an independent power source such as a battery for the smart chip. E.g., a battery-powered smart chip could communicate with a digital electronic device via an infrared link or other form of remote transmission.

Figure 2B:
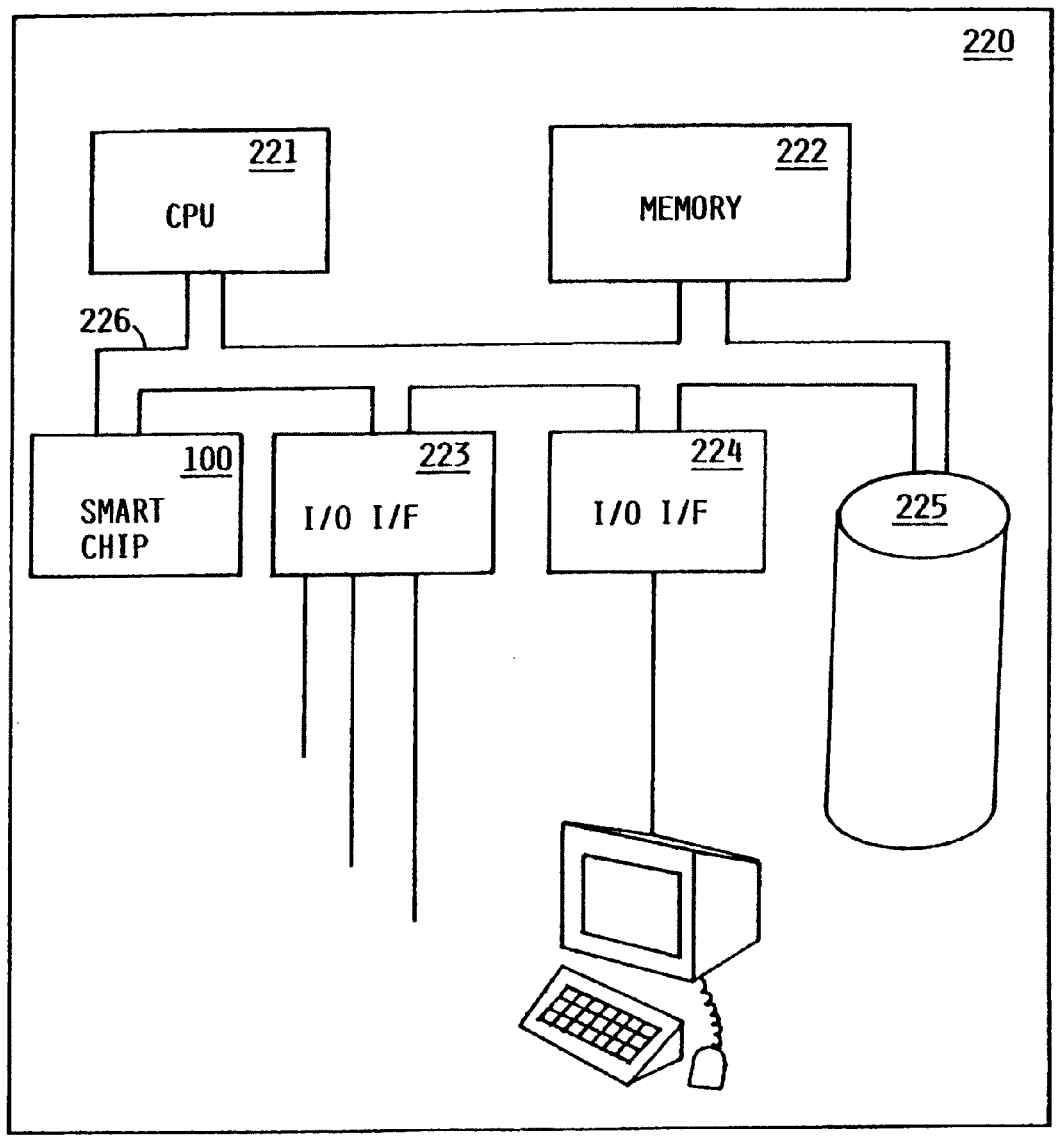

As shown in FIG. 2B, smart chip 100 is an integral part of digital data device 220, which is the protected tangible object. Digital data device 220 may contain, e.g., processor 221, memory 222, input/output interfaces 223-224, and data storage 225, which communicate with each other through communications bus 226.

In either the configuration of FIG. 2A or FIG. 2B, smart chip 100 is permanently attached to the respective protected object (i.e., object 201, or digital data system 220) in such a manner that it is not practical to remove it and attach it to other like objects. Almost any chip can be removed with either sufficient force and/or by using the reverse of complex manufacturing processes, but for this purpose it is sufficient if removal is either highly likely to destroy the chip, prohibitively expensive, or impractical for some other reason. Various adhesives or attachment processes are available which would create a bond between the smart chip 100 and the protected object such that removal is likely to destroy the chip or otherwise impractical, the exact choice of means usually depending on the type of object being protected.

The representations of FIGS. 2A and 2B are intended as an exemplary simplified representations, it being understood that many variations in digital device configuration are possible in addition to those mentioned here. The number and type of attached devices may vary considerably. Digital devices 210 or 220 may be any of various models of single-user computer systems known as "personal computers". Devices 210 or 220 may also be larger multi-user computer systems such as an IBM Enterprise system or an IBM AS/400 system. While a single interactive display, keyboard and pointing device are shown in each of FIGS. 2A and 2B, such a multiuser system may support the attachment of multiple terminals, each having a display and input means. Such multiple terminals may have their own processors and memory, so that various functions could be distributed between the processor of the mainframe computer system and the processors of the terminals. For example, multiple interactive workstations could be attached to a mainframe computer system, the mainframe storing a database of service provider and client data, while user interactions are provided through the interactive workstations. Alternatively, the present invention could be implemented using a client-server computing model in which a central server or servers of the service provider store data or perform certain tasks on behalf of the service provider's requesting terminals which act as clients (not to be confused with clients of the service provider). Finally, digital device 210 or 220 need not be a general purpose computer system, but could be any of various special-purpose digital devices. For example, the digital device could be an on-board automotive computer control system, a satellite television receiving system, a robotic control system, etc. In this case, the number and type of I/O devices or other devices are typically more limited. For example, such systems often lack a general purpose display and keyboard for user interface, although limited function interfaces may be provided. The present invention should therefore not be construed as limited to any particular type or configuration of digital device.

Figure 3:
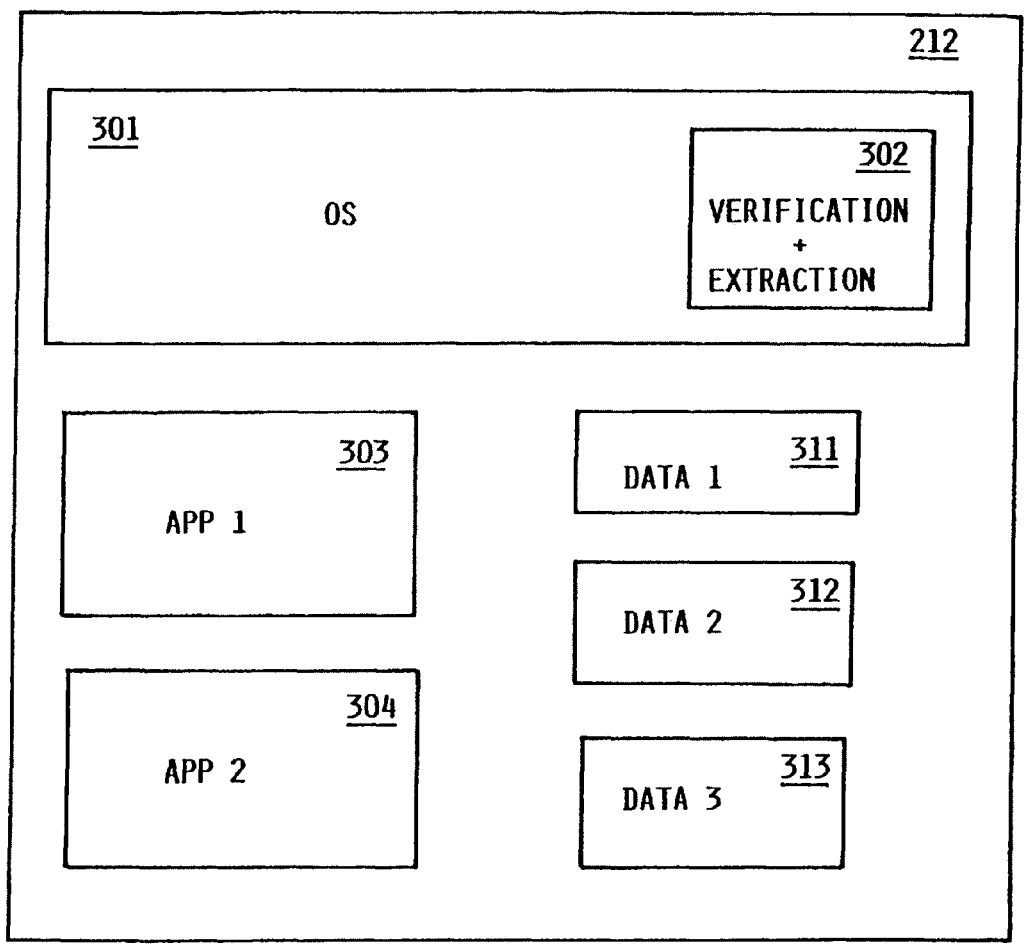
FIG. 3 is a conceptual illustration of the major software components of a digital device which uses a smart chip to identify or authenticate an object, according to the preferred embodiment.

FIG. 3 is a conceptual illustration of the major software components of a digital device which uses a smart chip to identify or authenticate an object. For illustrative purposes, the various software components are shown in FIG. 3 as being within memory 212 of FIG. 2A, it being understood that this could also represent the memory 222 of FIG. 2B. As shown in FIG. 3, operating system 301 provides various low-level software functions, such as device interfaces, management of memory pages, management of windowing interfaces, management of multiple tasks, etc. as is well-known in the art. In addition, operating system 301 contains verification and extraction function 302 for verifying and extracting data from smart chip 100, as explained in greater detail herein. Verification and extraction function 302 is shown in FIG. 3 as part of the operating system; however, it will be appreciated that it could be part of an application program or a stand-alone application, and in either case typically would not be part of operating system 301. Memory 212 further includes various application programs 303-304, which may use data contained in data files 311-313. Application programs may further use data, particularly attribute data, associated with the protected object. For example, if the protected object is a bank card, an application program invokes the verification and extraction operating system function 302 to receive attribute data relating the bearer's identifying characteristics, credit, account numbers, and so forth, and may use this data to verify the bearer's identity (e.g., comparing a signature of the bearer to a pre-recorded facsimile signature in the attribute data), verify credit, charge the correct account, etc. Additionally, applications 303-304 may include applications which are unrelated to the use of smart chip 100 and do not use data therefrom, such as, word processing, spreadsheet, electronic calendar, accounting, graphics, or any of thousands of other possible applications. Applications 303-304 utilize data contained in database files 311-313.

While a certain number of application programs, files or other entities are shown in FIG. 3, it will be understood that these are shown for purposes of illustration only, and that the actual number and type of such entities may vary. Additionally, while the software components of FIG. 3 are shown conceptually as residing in memory, it will be understood that in general the memory of a digital data system will be too small to hold all programs and data simultaneously, and that information is typically stored in data storage 215 or 225, comprising one or more mass storage devices such as rotating magnetic disk drives, and that the information is paged into memory by the operating system as required.

Figure 4A:
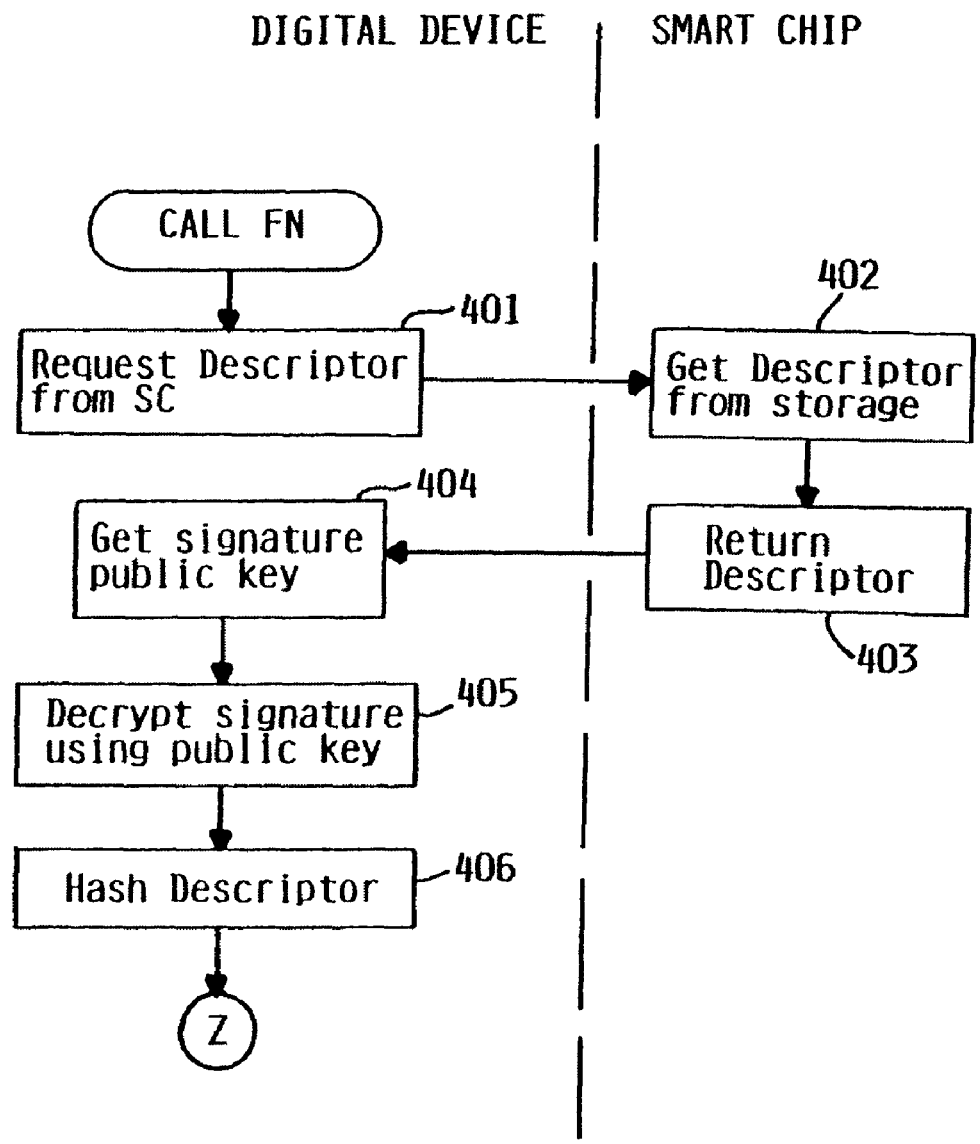
FIG. 4 is a high-level flow diagram of the process of extracting and verifying data from a smart chip, according to the preferred embodiment.
Figure 4B:
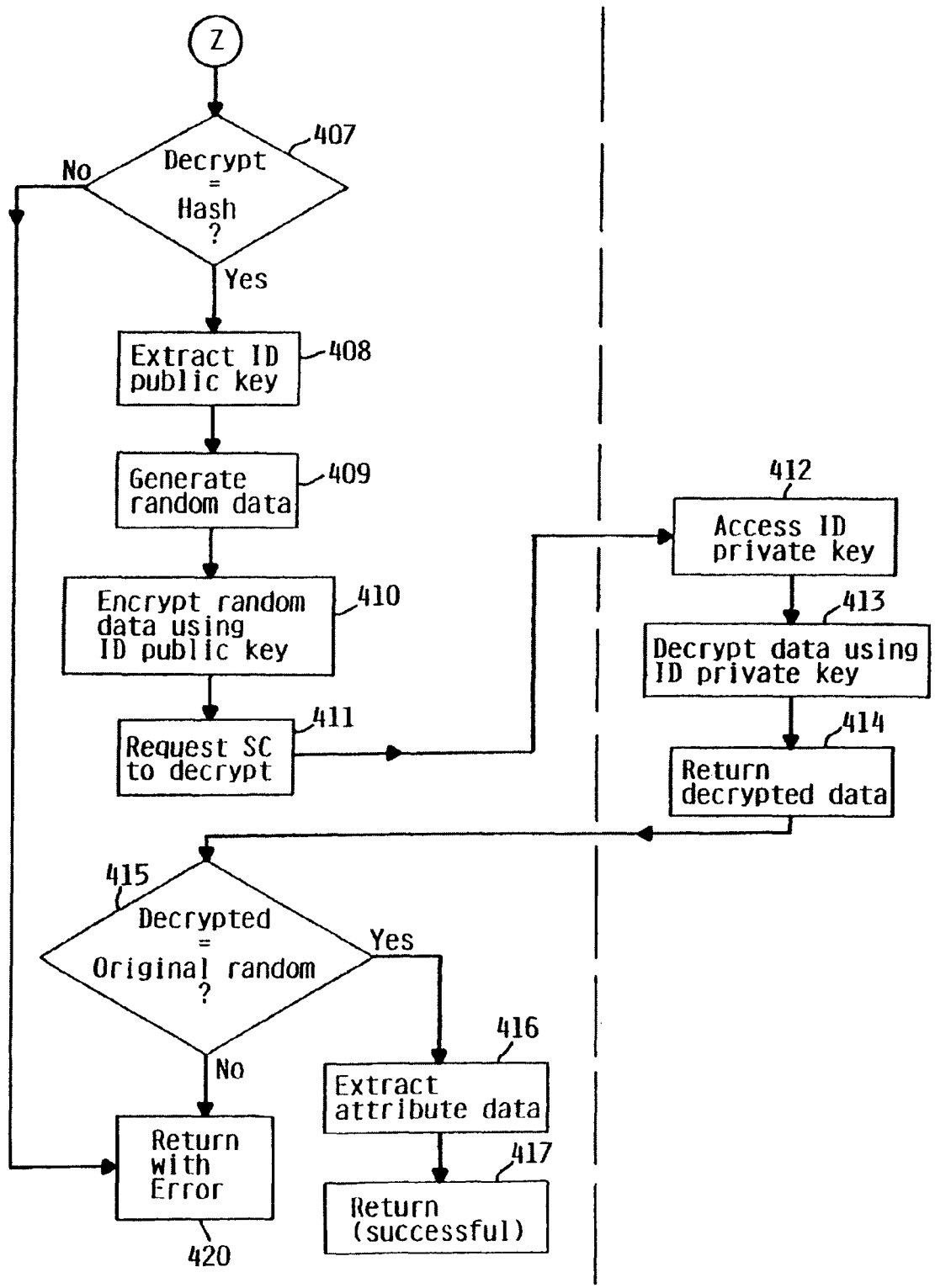

FIG. 4 is a high-level flow diagram of the process of extracting and verifying data from the smart chip, performed by the extract and verify function 302 in conjunction with smart chip 100, according to the preferred embodiment. In this embodiment, a digital device extracts and verifies information from a smart chip. This process involves an exchange of information between the digital device and the smart chip. FIG. 4 illustrates this process by a generally vertical dashed line dividing FIG. 4 into a left portion and a right portion, the left portion representing steps performed by the digital device, and the right portion representing steps performed by the smart chip.

The extracting and verifying function 302 is shown as part of the operating system of the digital device, although it may alternatively be a separate application or a part thereof. Some other program (e.g., an application program or a control program) calls the extracting and verifying function 302 in order to extract data from a smart chip and verify the data. The verifying function is intended to verify that (a) the data extracted belongs to the physical smart chip from which it was taken, and (b) the data extracted has not been altered in an unauthorized manner. If verification completes successfully, the extract and verify function 302 returns the extracted data.

The identity public key of the smart chip is verified by generating test data (also referred to as "challenge data"), performing a data transformation according to the pre-defined public/private key encryption algorithm using the identity public key, requesting the smart chip to perform the complementary data transformation according to the pre-defined public/private key encryption algorithm using its hidden identity private key, and comparing data which has undergone both transformations to the original test data. Test data is preferably randomly generated data, although this is not strictly required in all environments. It will be observed that it is equally possible to perform the identity public key transformation first, followed by the complementary transformation using the identity private key, as it is to perform the identity private key transformation first, followed by a complementary transformation using the identity public key. In the embodiments described below, the identity public key transformation (referred to as an encryption using the identity public key) is performed first, followed by the complementary transformation (referred to as a decryption using the identity private key). The consistent use of a single convention in the detailed description herein (encryption using the identity public key, followed by decryption using the identity private key) is intended to promote ease of understanding the various embodiments of the present invention, and is not intended to limit the scope of the invention to this particular sequence. Consistent with the present invention, it is possible to generate test data, request the smart chip to encrypt the test data using its identity private key, decrypt the encrypted test data using the identity public key, and compare the result to the original test data.

As shown in FIG. 4, upon invoking the extract and verify function 302, the digital device requests the descriptor from the smart chip (step 401). Upon receiving the request, the smart chip's processor 101 retrieves the descriptor from its external data storage 105 (step 402), and returns the descriptor data across interface 111 to the digital device.

In the preferred embodiment herein described, all descriptor data is stored in the smart chip itself in an appropriate external data storage area 105. This option is generally preferred where the volume of descriptor data is not large. However, it must be recognized that there will be situations in which the volume of descriptor data is so large that it can not be conveniently stored in chip 100, or there are other reasons for storing it elsewhere. In such cases, many possible variations exist for storing all or portions of the descriptor data elsewhere. For example, the data stored in smart chip 100 may include only a public identity key, digital signature, and a database index. Upon the return of partial descriptor data from the smart chip, the digital device may be required to access a database (which may be external to the digital device) using the index in order to obtain complete descriptor data. Furthermore, the descriptor data may be stored in one or more additional memory chips (external to smart chip 100) which are permanently attached to a protected tangible object. The additional steps required to retrieve full descriptor data from other locations, such as databases or storage external to smart chip 100, are not shown in FIG. 4.

The extract and verify function 302 of the digital device obtains the signature public key used for verifying the digital signature within the descriptor data (step 404). The signature public key, being intentionally public, need not be protected. It is normally intended that all protected tangible objects of a particular model or type or from a particular manufacturer use the same signature public key. Therefore, the signature public key might be contained in a data file in the digital device itself, or could even be hard-coded in the extract and verify function itself. Alternatively, the signature public key might be retrieved from an external database.

The extract and verify function 302 then decrypts the digital signature contained within the descriptor data using the signature public key and a pre-defined public/private key encryption/decryption algorithm (step 405). The public/private key encryption/decryption algorithm will herein be referred to as the signature encryption algorithm. Extracting fields such as the digital signature from the descriptor data requires that the data have a pre-determined format; e.g., pre-defined delimiters can be used for identifying the signature or other data within the descriptor data.

The digital signature represents an encrypted derivation of certain descriptor data. Specifically, the source data for the digital signature is the descriptor data other than the digital signature, i.e., the identity public key and the attribute data. This source is hashed using a known hash function and encrypted using the signature private key and the signature encryption algorithm. The encrypted version thus generated is the digital signature. In order to preserve data integrity, the signature private key should be accessible only to the entity which is authorized to generate the descriptor data, referred to herein as the issuer. Thus, all digital signatures are generated by the issuer using a set of descriptor data.

Hashing is performed because, in general, the amount of descriptor data would create an excessively large digital signature if encrypted in its entirety, yet it is desirable to protect all of the descriptor data. The hash can be constructed using any of various known hashing algorithms, provided that the algorithm to be used is defined to the digital device. Either an MD5 or an SHA-1, which create 16-byte and 20-byte hashes, respectively, are appropriate hashing algorithms, it being understood that other hashing algorithms now known or hereafter developed could also be used. It should further be understood that, in the broadest sense, a digital signature is constructed from some derivation of the descriptor data in order to provide an indication whether the descriptor data has been altered, but the derivation is not necessarily a hash of the descriptor data. For example, if the descriptor data to be protected is sufficiently brief, the digital signature might be simply an encryption of the descriptor data itself.

The extract and verify function 302 then constructs a hash of the descriptor data other than the digital signature, i.e., the descriptor data consisting of the identity public key and the attribute data, which was used as a source for generating the digital signature by the issuer (step 406). The decrypted digital signature generated at step 405 is then compared to the hashed descriptor data generated at step 406. If the data match, then the descriptor data read from the smart chip is the same as that which the was used to generate the digital signature, indicating that the data has not been altered in an unauthorized manner. In this case, the "Y" branch is taken from step 407. If the data do not match, then the descriptor data has somehow been altered after the signature was generated or the descriptor data was signed by a different private key, and the "N" branch is taken from step 407.

Assuming proper authentication of the descriptor data (the "Y" branch from step 407), the extract and verify function then determines whether the data itself matches the physical smart chip from which it was removed. This procedure is necessary because, without it, it may be possible to simply replicate a descriptor (digital signature and all) from a validly issued smart chip, and thus replicate any desirable attributes from the validly issued chip. In order to do this, the function extracts the identity public key from the descriptor data (step 408), and generates random data (step 409). The random data is then encrypted using the identity public key and a pre-defined public/private key encryption/decryption algorithm, herein referred to as the identity encryption algorithm (step 410). The identity encryption algorithm could be the same as the signature encryption algorithm, but need not be.

The digital device then requests the smart chip to decrypt the encrypted random data generated at step 410, sending a command across the interface to the smart chip (step 411)

Upon receiving the command, the smart chip's processor 101 accesses the identity private key in hidden storage 103 (step 412), and decrypts the received encrypted random data using the identity private key and the identity encryption algorithm (step 413). The decrypted data is then returned to the digital device (step 414). The control program for the smart chip does not permit processor 101 to return the identity private key.

Upon receiving the returned decrypted data, the extract and verify function in the digital device compares the returned data with the randomly generated data before encryption (step 415). If the data matches, then the public key in the descriptor data belongs to the physical smart chip from which it was extracted; if not, the data may have been copied from another source and can not be considered reliable.

In the case of a data match, the "Y" branch is taken from step 415, and the attribute data is extracted from the descriptor and made available in some manner to the calling program (step 416). This could be accomplished, e.g., by returning the attribute data itself, or by writing the attribute data to a record or file accessible to the calling program. The extract and verify function then returns with an indication of successful completion (step 417).

If the data does not match at either step 407 or step 415, the extract and verify function returns with an appropriate error indication (step 420). The form of error indication and action to be taken by the calling program will vary depending upon the application. In some cases, the extract and verify function may return the attribute data, and the calling program may use it notwithstanding that it is considered unreliable, the calling program providing an appropriate indication such as a warning message to a user or to some other system or system component. In other cases, the failure of the extract and verify routine is cause for aborting a requested operation or shutting down a system or subsystem.

It will be appreciated that the order of certain steps may be altered, and that in particular it would alternatively be possible to first verify the identity of the smart chip, and then verify the digital signature of the attribute data.

Depending on the application, the digital data device may under some circumstances wish to alter attribute data stored in or associated with smart chip 100. In accordance with the present invention, attribute data can be updated in an authorized manner under reasonably secure conditions, and without undue logistical difficulty. Attribute data in a smart chip is preferably updated by performing a cooperative procedure involving the smart chip itself, the digital device into which the smart chip is plugged, and a remote central server under the control of the issuer. The digital device communicates with the remote server using any appropriate data communications medium. Since there is no requirement that the communications medium be secure, the Internet or the telephone network are appropriate communications media, although other media could be used. This procedure thus avoids the need to physically transport the protected object and its attached smart chip to the issuer for updating.

Figure 5A:
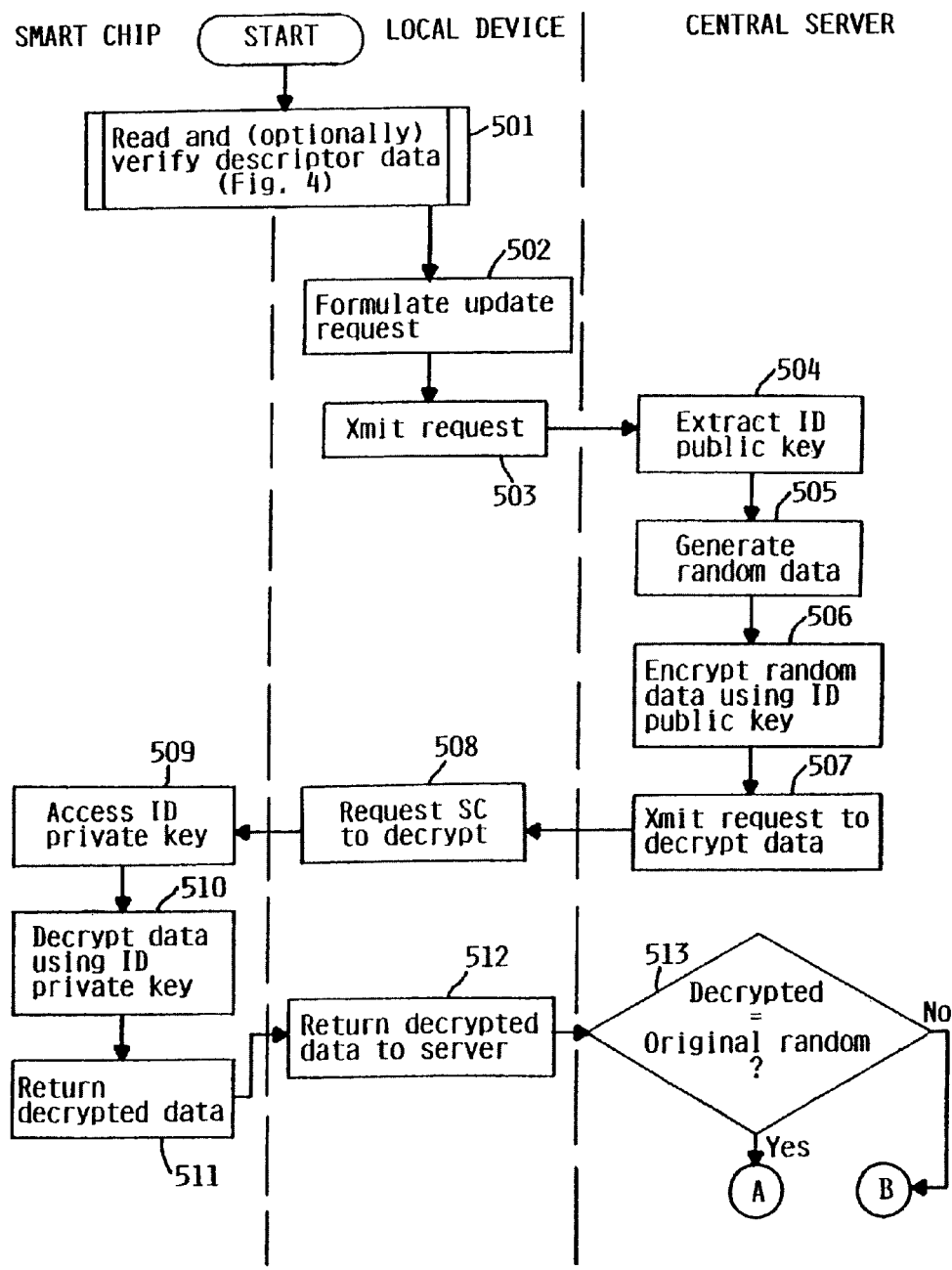
FIGS. 5A-5C are collectively a high-level flow diagram of the process of updating descriptor data associated with a smart chip, according to the preferred embodiment.
Figure 5B:
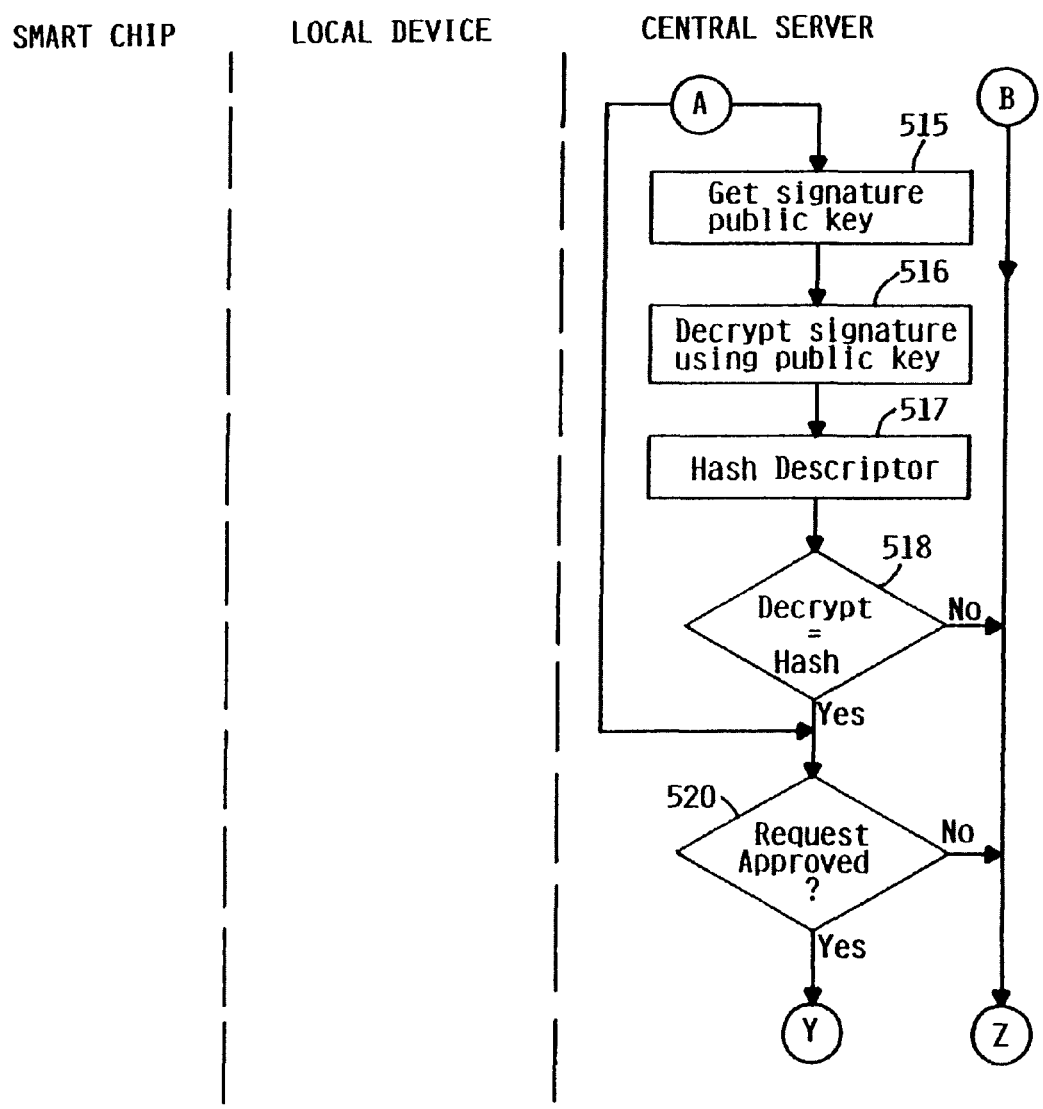
Figure 5C:
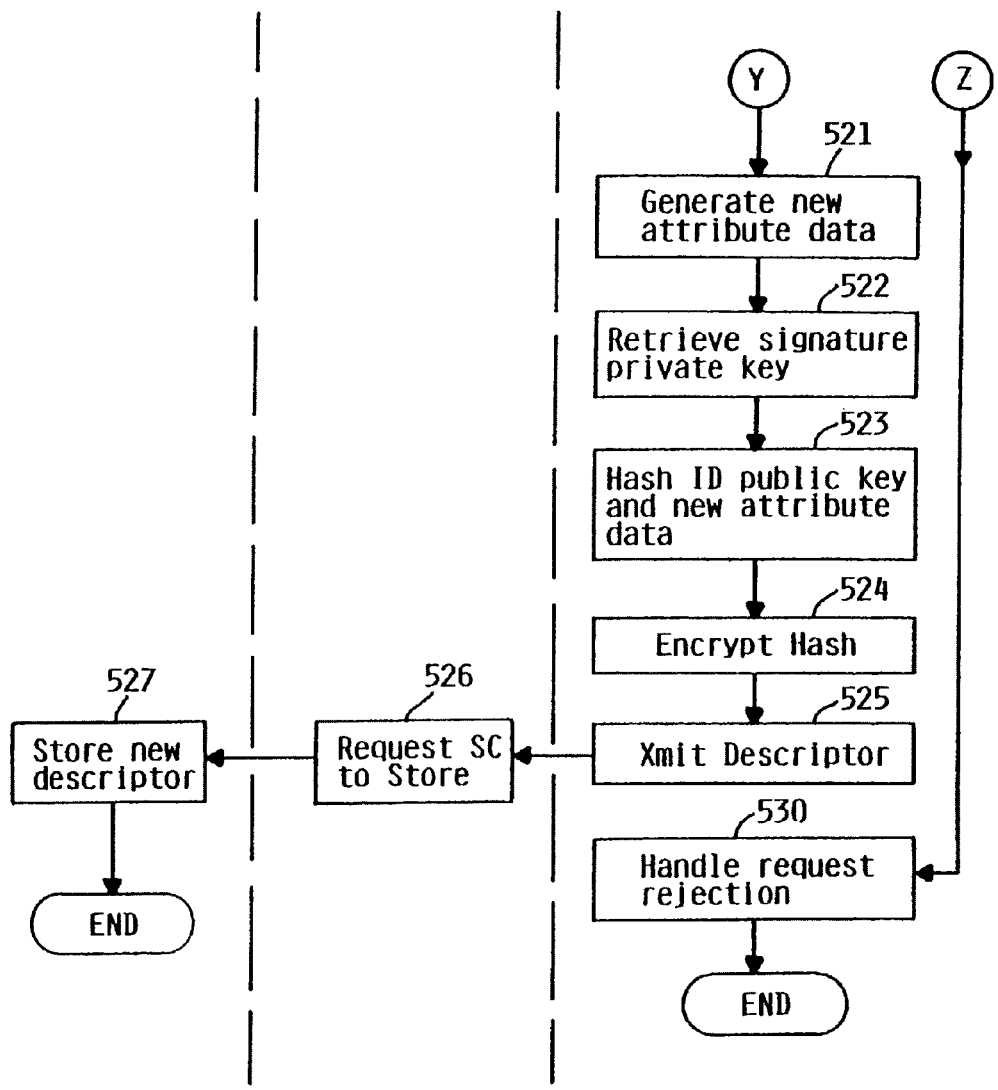

FIGS. 5A-5C (collectively referred to herein as FIG. 5) constitute a high-level flowchart illustrating a preferred method for updating descriptor data (which includes attribute data) associated with a smart chip. FIG. 5 illustrates the division of process steps between the smart chip, the locally attached digital device, and the remote server, by two generally vertical dashed lines dividing FIG. 5 into a left portion, a middle portion and a right portion, the left portion representing steps performed by the smart chip, the middle portion representing the steps performed by the local digital device, and the right portion representing steps performed by the remote server under control of the issuer.

As shown in FIG. 5, the local digital device (with coupled smart chip) reads and optionally verifies the existing attribute information in the smart chip. This process is described above and shown in FIG. 4, it being represented in FIG. 5 as step 501. Specifically, the local digital device and smart chip perform steps 401-403 to read the descriptor from the smart chip. Optionally, the local digital device also verifies the descriptor as shown and described above with respect to steps 404-420. Because the central server also verifies the descriptor as described below, it is not strictly necessary that the local digital device do so in this case. If the verification process fails, the action taken may depend on the application and reason for failure. E.g., if the verification process fails because the smart chip is unable to successfully decrypt random data using its identity private key, then it is unlikely that any update can be performed; on the other hand, if the identity private key is verified but the digital signature does not match the current attribute data, the application may choose to simply request new attribute data and a new digital signature.

An update request relating to the attribute data is then formulated at the local device (step 502). The update request may itself contain the new attribute data, or may be a request that the server generate the new attribute data according to some parameters specified by the local device. The local device may solicit user input in generating an update request. When the request is generated, it is transmitted to the remote server (step 503). Generally, this request data transmitted to the remote server will include the entire existing descriptor to enable the central server to perform full verification of the existing descriptor contents, but it may include only the identity public key, or it may include the identity public key together with a portion of existing descriptor data.

Upon receipt of the update request, the central server verifies the identity of the device (smart chip) to which the request pertains. This process is shown in FIG. 5 as steps 504-513, and is similar to the process performed by a local device in verifying the identity of the smart chip, described above. The server first extracts the ID public key from the descriptor data which was sent with the update request (step 504). The server generates random data to be used for verifying identity (step 505). The random data is then encrypted using the identity public key and the pre-defined public/private key identity encryption algorithm (step 506). The server then transmits the encrypted random data to the local device, requesting that it be decrypted by the smart chip (step 507).

Upon receipt of the encrypted random data generated at step 506, the local device requests the smart chip to decrypt the data, sending a command across the interface to the smart chip (step 508) Upon receiving the command, the smart chip's processor 101 accesses the identity private key in hidden storage 103 (step 509), and decrypts the received encrypted random data using the identity private key and the identity encryption algorithm (step 510). The decrypted data is then returned to the local device (step 511), which transmits it to the central server (step 512).

Upon receiving the returned decrypted data, the central server compares the returned data with the original randomly generated data (step 513). If the data matches, then the public key in the descriptor data belongs to the physical smart chip making the update request, i.e., the identity of the smart chip has been verified. In this case, the "Y" branch is taken from step 513, and update processing continues. If the data does not match, then all bets are off. Any number of things, either fraudulent or accidental, might have caused a mismatch, but it is impossible to update descriptor data if the central server can not verify the identity of the smart chip. Accordingly, the "N" branch is taken from step 513, and descriptor data is not updated.

If the "Y" branch is taken from step 513, the server optionally verifies the contents of the existing descriptor, shown as steps 515-518. As shown in FIG. 5, the "Y" branch from step 513 diverges into two paths, one going through steps 515-518, and the other by-passing these steps to go directly to step 520. Verification of the descriptor contents is optional because, in at least some applications, the descriptor will be completely overwritten by a new descriptor, and the central server doesn't care what was in the old attribute data. For example, in the motor vehicle network application described herein, the server may simply overwrite the old data when a part is legitimately exchanged, without verifying the contents. However, in general it is assumed that the central server will verify the descriptor contents. In many cases the identity of the user is contained in the attribute data, and it is necessary to verify the user's identity before proceeding further. In others, any unauthorized alterations to attribute data may indicate fraud or some other circumstance requiring investigation.

The verification of the descriptor data by the server is similar to verification of such data by the local device, described above with respect to steps 404-407 of FIG. 4. The server verifies the descriptor data by retrieving the signature public key, a copy of which would preferably be kept by the server (step 515), and decrypting the digital signature within the descriptor using the signature public key and the pre-defined public/private key signature encryption algorithm (step 516). The server then derives a hash or other pre-defined function of the source data for the digital signature, i.e., the identity public key and the attribute data (step 517), as explained above with respect to step 406.

If the decrypted digital signature matches the hashed data (step 518), then the descriptor contents have been verified. In this case, the "Y" branch is taken from step 518, and update processing continues. If the data do not match, then the descriptor data has somehow been altered after the signature was generated, and the "N" branch is taken from step 518.

Having verified the identity of the smart chip, and if necessary, the contents of the descriptor data, the server determines whether the request will be approved, and if so, approves it (step 520). In general, it will be desirable that the central server maintain control over the update process, which implies an approval process. In some cases the approval may in fact be automatic. More typically, approval will require access to one or more databases to verify information, such as payment of a fee, sufficient credit in an account, an absence of a report of theft or fraud, and so forth. If the request is not approved for any such reason, the "N" branch is taken from step 520; otherwise the update processing continues via the "Y" branch from step 520.

The server generates new attribute data, as necessary (step 521). In some cases, the new data will be provided entirely by the requesting local device with the request (subject to approval by the server), making this step unnecessary. In other cases, the server must generate it. For example, if the request is to add an additional channel to the reception capability of a satellite receiver, the attribute data may include an encryption key for the additional channel. In this case, the local device will probably not have the key, and can only request it using some appropriate channel identifier. The server will fetch the key from a database.

The server then accesses its signature private key (step 522), generates a hash of the identity public key together with the new attribute data according to a pre-defined hashing algorithm (step 523), and encrypts the hash using the private signature key and the signature encryption algorithm (step 524). The encrypted hash created at step 524 represents the digital signature.

The new descriptor, comprising the identity public key, new attribute data, and newly generated digital signature, is then transmitted back to the local digital device using the communications medium (step 525). Upon receipt of the new descriptor data, the local digital device requests the smart chip to store the data (step 526), and the smart chip stores the descriptor data in its appropriate place (step 527), completing the process of updating descriptor data. This may mean requesting the smart chip to store it in its external data storage 105, or may mean storing it in any other storage used for the descriptor data. Since the new descriptor can only be used/verified by the smart chip whose identity private key corresponds to the identity public key in the descriptor data, there is no concern that the descriptor data can be intercepted and used on a different device from that for which it was intended.

In the event that an update request fails any of the tests described above with respect to steps 513, 518 or 520, the central server has an appropriate mechanism for handling the cause of rejection, shown generically as step 530. This could vary considerably depending on the application, and may amount to anything from a simple rejection message to the requestor to alerting law enforcement authorities for appropriate action.

In the embodiment described above, it has been generally assumed that it is not necessary to protect attribute data from being read, and only necessary to protect it from being altered. In many cases, this will be true, and it will be more convenient to simply store attribute data in plain text form, available to be read by any device having an appropriate interface. However, it will be recognized that in some applications it may be desirable to protect the attribute data from being read as well as to protect it from being altered. In these circumstances, the additional level of protection can be accomplished by encrypting the attribute data. Attribute data could be encrypted using a third pair of keys (i.e., keys different from either the signature key pair or the identity key pair) and possibly an encryption algorithm different from either used for the signature or the identity. But it is also possible to use the identity key pair and corresponding identity encryption algorithm, thus avoiding the need for additional keys. Specifically, when the issuer initially generates or subsequently updates attribute data, all or a portion of the data is encrypted using the identity public key and the identity encryption algorithm. The digital signature is then generated by hashing the identity public key and this encrypted form of the attribute data, followed by an encryption using the signature private key, as previously described. In order to read the attribute data, verification steps 401-417 are performed as described earlier. Additionally, the digital device passes the encrypted attribute data to the smart chip, requesting the smart chip to decrypt the same. The smart chip accesses its identity private key, decrypts the encrypted attribute data, and returns it to the digital device. The decryption of attribute data could be performed before or after the identity of the smart chip is verified, or before or after the digital signature is verified.

Exemplary Use: Satellite (or Cable) Television Receiving System

A fourth exemplary use of a smart chip protection mechanism is now described. In this use, the smart chip is embedded in a satellite television receiving system (which is the "digital device"). In general, the description herein applies equally well to cable television receiving systems. The smart chip stores what is effectively a unique identifier for the system (i.e., the identity private/public key pair). The descriptor stored in the smart chip includes attribute data identifying the television broadcasts which the user is entitled to receive, and may include additional user identifiers such as a name or account number. Specifically, it is preferred that the attribute data include the descrambling information needed to receive authorized selective channels, i.e., those to which a user subscribes.

Figure 6:
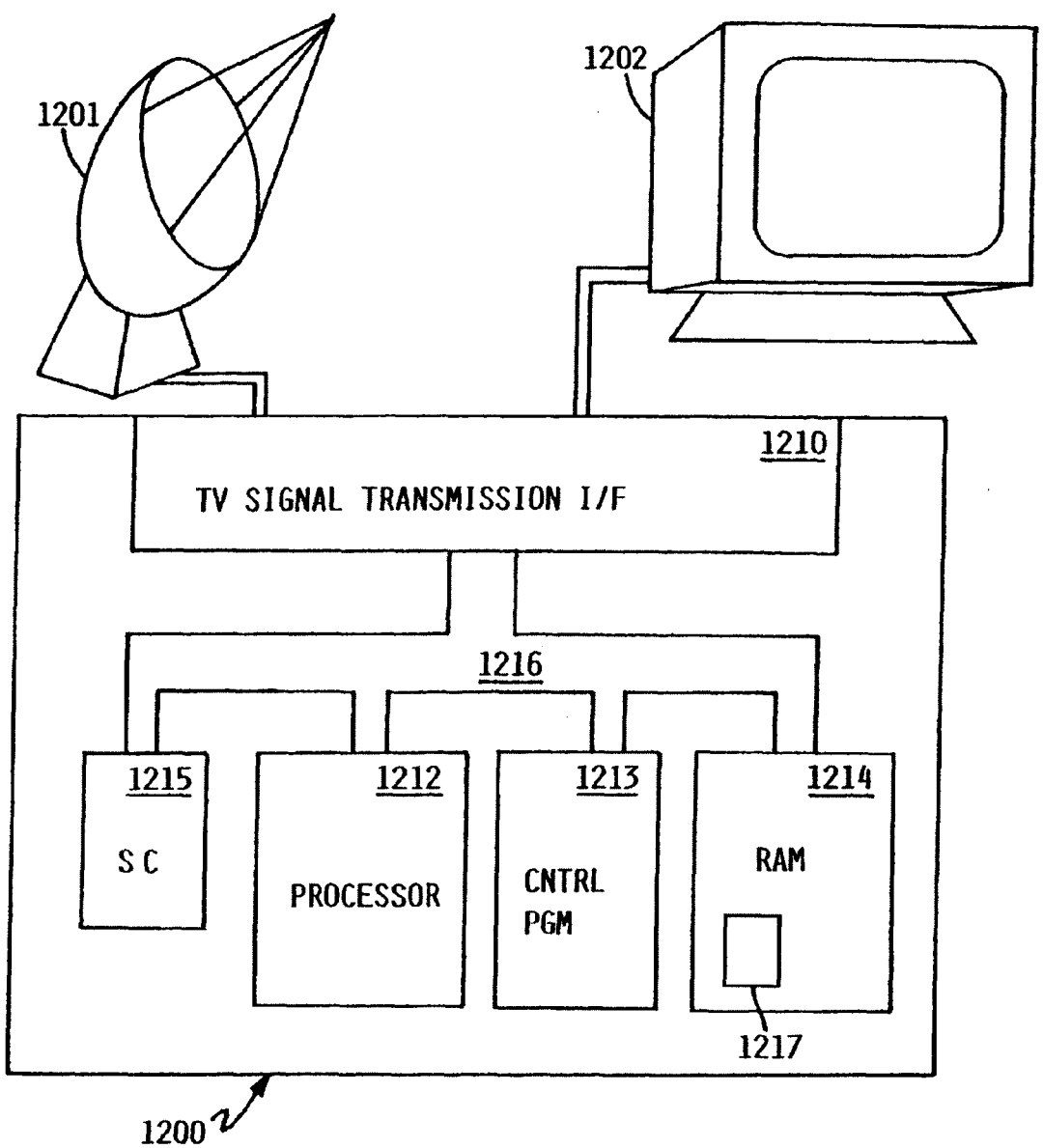
FIG. 6 is a high-level block diagram of the major components of a satellite television receiving system, according to an exemplary use of the preferred embodiment of the present invention.

The major components of such a satellite receiving system are shown in FIG. 6. Physically, the receiving system is typically located in the home of a subscriber. The receiving system may be owned or leased by the subscriber, but in any case the subscriber pays for the privilege of receiving the service. The receiving system 1200 is coupled to and receives signals from satellite receiving dish 1201, and provides unscrambled video input to television display 1202. Receiving system 1200 includes a television signal transmission interface 1210 for receiving the incoming signal from the satellite dish and driving an output video signal to the television display 1202; control processor 1212, which is a programmable processor for executing a control program; read-only memory 1213 containing a control program which executes on control processor 1212 to control the operation of system 1200; dynamic random access memory 1214 for storing state information and other temporary data; smart chip 1215; and internal data bus 1216 for communicating data among the various components of the system. It will be recognized that FIG. 6 is intended as a simplified representation of a satellite receiver system, and that an actual system may contain other or additional components or be configured differently.

In this exemplary use, the control program executing in control processor 1212 periodically polls smart chip 1215 to extract the current attribute data. Attribute data includes descrambling information for the channels the subscriber is entitled to receive. This information may be nothing more than a bit mask, in which one bit is assigned to each channel, indicating whether or not the subscriber is entitled to receive it. Alternatively, it may include descrambling keys for each channel the subscriber is entitled to receive, the keys being used to descramble the received television signal. For added security, descrambling keys could be encrypted within the descriptor using the identity public key of the smart chip; the control program would request the smart chip to decrypt the encrypted descrambling keys, using the identity private key of the smart chip. Whatever its form, the descrambling information is stored in a channel table 1217 in RAM 1214. When a subscriber selects a particular channel to receive, the control program accesses the channel table to determine the subscriber's authorization. If necessary the appropriate descrambling key will be obtained from the table and used to descramble the signal.

Typically, channels are scrambled simply to make it difficult for an unauthorized person to view the signal, and not to prevent all access to data, as in the case of encryption of sensitive data. The bandwidth of a television signal may make full encryption impractical, and therefore simpler techniques are generally used to scramble a signal. However, the present invention is not limited to any particular technique for scrambling the television signal, and could apply to any technique now existing or hereafter developed, including the encryption of a signal.

Figure 7:
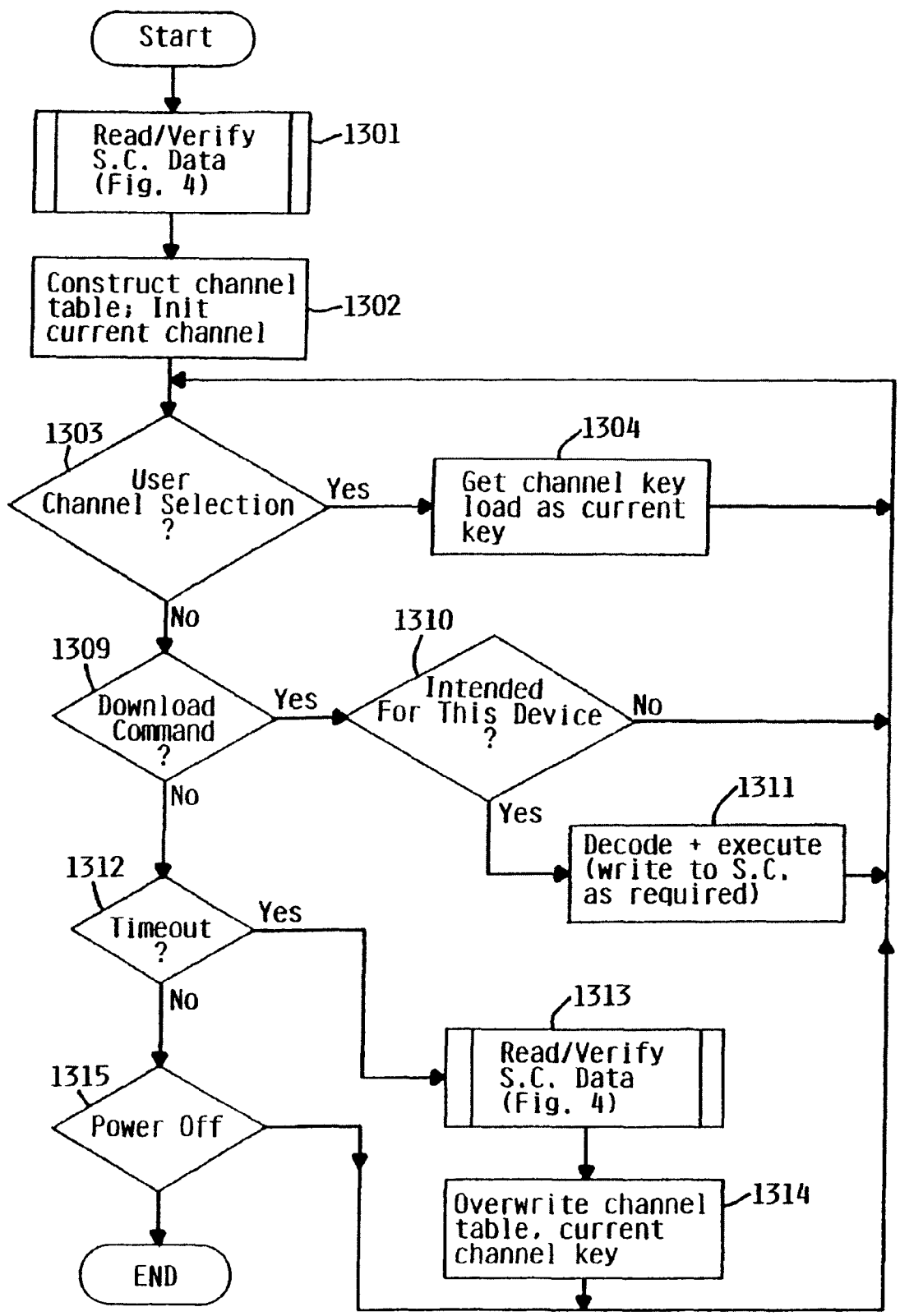
FIG. 7 is a high-level flow diagram illustrating the operation of the control program of a satellite television receiving system, according to an exemplary use of the preferred embodiment of the present invention.

FIG. 7 is a high-level flowchart illustrating the operation of the control program executing in processor 1212 of receiving system 1200. As shown in FIG. 7, upon power-on, the control program reads and verifies the attribute data in smart chip 1215 by performing the steps described herein and illustrated in FIG. 4; this process is represented in FIG. 7 as step 1301. The control program then initializes its dynamic state variables in RAM 1214, and in particular, constructs a channel table 1217 which contains a list of channels and corresponding descrambling data read from the attribute data in smart chip 1215. The data for the currently selected or default channel is initialized as the current channel data. If necessary, descrambling data is decrypted before entering it in table 1217. The current channel data is used to set the state of the signal transmission interface 1210, i.e., the transmission interface transmits the selected channel signal to the television display 1202, descrambling the signal as indicated by the descrambling data. The current channel data may, e.g., be held in a register (not shown) within signal interface 1210.

The control program then enters an operating state wherein in repetitively checks for various conditions and responds, represented generally as steps 1303-1315. While in this operating state, the signal interface 1210 continuously receives incoming signals from receiver dish 1201 on a selected channel, descrambles the signal if so indicated by the descrambling data for the current channel, and transmits the resultant signal to television display 1202. If a user makes a new channel selection (step 1303), the control program gets the channel descrambling data corresponding to the newly selected channel from table 1217, and loads this as the current channel data (step 1304). The control program also changes the selected channel for the interface 1210 to receive.

In addition to video signals, receiver system 1200 may receive commands broadcast by satellite. Such commands could be broadcast over a separate command channel, or could be interleaved in the video signal of any programming channel. Commands may be of a sort which are intended for all receiving systems (e.g., a clock set signal), or may be intended for a single receiving system, in which case the command will carry a unique system identifier. Upon receiving a command (step 1309), the control program determines whether the command is intended for system 1200 (step 1310); if not, it is ignored. If the command is intended for system 1200, the control program executes the command (step 1311). Among other commands, the received command could contain the unique identifier for system 1200, and could direct it to store an updated descriptor in smart chip 1215. By this means, it is possible to receive updated attribute data, to be stored in smart chip 1215, via satellite. Because only smart chip 1215 has the identity private key needed to decrypt the encryption keys, the updated descriptor is protected notwithstanding that it is broadcast via satellite to any receiving device.

The receiving system periodically reloads the smart chip data into RAM. When a timeout of the reloading period occurs (step 1312), the control program again reads and verifies smart chip data (step 1313), as described above and illustrated in detail in FIG. 4. It then overwrites the channel table and current channel data with the data read from the smart chip (step 1314). Periodic reloading prevents a subscriber from keeping obsolete descrambling data or data to which he is no longer entitled in the channel table.

If the subscriber selects power-off (step 1315), execution ends; otherwise, the control program returns to step 1303.

FIG. 7 does not depict the action to be taken in the event that the verification function performed at either step 1301 or step 1313 fails, and this is a business decision for the service provider. It will be assumed that, in general, the service provider will deny service (i.e., the receiver will shut itself off, or will cease descrambling of any scrambled channels) in this event. However, the service provider may wish to give the subscriber a warning that service will be discontinued if some action is not taken before a deadline. E.g., the subscriber may be required to return the receiver unit for replacement.

In the television industry, it is common for a subscriber to change his subscribing options, i.e., to change the channels he is authorized to receive. Such a change is often accompanied by a change in service fee. Additionally, a subscriber may pay to receive specific broadcasts. Alteration of the attribute data in smart chip 1215 can be made as described herein without the need for service personnel to visit the subscriber's home, and without the need to physically bring the receiver unit into a service location.

In order to facilitate updating of subscriber choices, a modified version of the process depicted in FIG. 5 is used. Because there may be no practical way for receiver device 1200 to transmit data to the central server (satellite reception being one-way), steps 501-503 depicted in FIG. 5 are not performed. Instead, the service provider of satellite television services maintains a database of subscribers, corresponding identity public keys, device identifiers (such as serial numbers) of the receiving devices, customer subscription options, credit information, and the like. For security purposes, it is preferable that the service provider have no record of identity private keys. The service provider also maintains the signature private key, which must necessarily be maintained in secrecy. A customer wishing to change his subscription options initiates a request by telephone, mail, internet, or the like. The subscriber need not know the identity public key or other data relating to his receiver. The customer simply gives his name and desired subscription options to initiate the request.

The service provider's server then approves the request by accessing credit information and so forth, or receives human input approving the request (step 504). The server retrieves the subscriber's identity public key from its database, device identifier, channel encryption keys, and any other information necessary to construct new attribute data for the subscriber's receiving system (step 505). As part of constructing the attribute data, the channel descrambling information may be encrypted using the identity public key. Steps 506 through 508 are performed as described earlier. The complete updated descriptor is then transmitted to the subscriber's system by satellite broadcast (step 509), using the subscriber's identifier to specify the receiving system. The subscriber's system stores the new descriptor in its smart chip upon receipt of the broadcast data (step 510). Any receiving system other than the subscriber's system will ignore the updated descriptor (since it has a different identifier), and would be unable to use it in any case because it would lack the identity private key needed to verify the descriptor and decrypt the channel decryption keys.

Additional Variations

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as program memory 102, in FIG. 2A as memory 212 and data storage device 215, and in FIG. 2B as memory 222 and data storage device 225.

In various illustrative uses described herein, it is desirable to assign some form of unique identifier (such as a serial number) to an object protected by a smart chip. Since the identity public key is considered unique for all practical purposes, it would be possible to use the key itself as an identifier, obviating the need for a separate identifier. However, in general the identifier may be used for other purposes (such as indexing information in a database, and therefore a separate (and usually shorter) identifier will often be desired.

It will be recognized that, given sufficient time and resources, it may be possible to read the identity private key from a smart chip. E.g., electrical probes of the chip, thermal or timing analysis, or other means might conceivably be used to obtain an identity private key. However, the only thing a pirate can do with such a key is make an exact duplicate of the existing smart chip, including all its descriptor data. I.e., the service provider's security system itself remains essentially intact, and identity private keys of other users remain uncompromised. Once a service provider learns that a particular identity private key has been copied, the corresponding public key is simply deactivated in the service provider's database. Any subsequent attempt to use the key, e.g., to update the descriptor data, or perform a transaction requiring access to the service provider's database, will run across the deactivated notation in the database and cause the service provider to refuse service. Thus, if a pirate makes a large number of illicit copies, all of these are easily deactivated once their existence is known to the service provider, without affecting the validity or operation of other legitimate users.

As explained herein, the purpose of the digital signature is to be able to detect alteration of data. In various exemplary embodiments described herein, a digital signature is obtained by performing a hash function of the data to be protected (i.e., the identity public key and the attribute data), and then encrypting the result using a public/private key encryption algorithm and a signature private key which is preferably known only to the issuer. This technique provides a relatively high degree of security while still permitting attribute data to be altered by the issuer. However, other techniques for generating digital signatures may be used. For example, the data to be protected may be directly encrypted without hashing or other alteration (i.e., the identity function may be used in place of the hash function); a checksum or similar derivation of the data to be protected may be encrypted; etc. Additionally, there may be alternatives to encryption using the public/private key algorithms. As used herein, a digital signature may include any data which can be used to detect data alteration of itself or other data, either now known or hereafter developed.

In the preferred embodiment, random data is generated and encrypted as test data to verify the identity of smart chip devices. It will be understood, however, that in a strictly mathematical sense it is impossible for a finite state machine such as a computer to generate truly "random" data. Various algorithms exist for generating data which approximates randomness, these typically being seeded with a variable, such as a system clock value, and any of these would generally be considered random. Furthermore, it may be sufficient to generate test data according to any of various algorithms or mechanisms which generate variable data which does not have an easily discernable pattern. Finally, in some environments, it may not matter whether patterns exist in the test data. E.g., if the test data is first encrypted by the smart chip using the identity private key, followed by decryption using the identity public key, it is assumed that the test data can be obtained by a snooper, and the test data merely needs to be different from previously used test data.

Although a specific embodiment of the invention has been disclosed along with certain alternatives, it will be recognized by those skilled in the art that additional variations in form and detail may be made within the scope of the following claims:

The invention claimed is:

1. A method for providing television service to a subscriber, comprising the steps of:
   receiving descriptor data transmitted over an unsecure medium in a television receiving apparatus of said subscriber, said descriptor data including an identity public key associated with a digital protection system of said television receiving apparatus for transforming data according to a first public/private key encryption algorithm, attribute data identifying television broadcasts which the subscriber is entitled to receive, and a digital signature of said descriptor data by an entity authorizing the subscriber to receive the television broadcasts identified by said attribute data;
   verifying that said identity public key and said attribute data in said descriptor data have not been altered using said digital signature;
   providing source test data;
   performing a first data transformation of a pair of data transformations of said source test data, said pair of data transformations producing resultant test data, said first data transformation being according to said first public/private key encryption algorithm using said identity public key;
   requesting said digital protection system of said television receiving apparatus to perform a second data transformation of said pair of data transformations of said source test data, said digital protection system including
   (a) a processor capable of performing said second data transformation according to said first public/private key encryption algorithm; and
   (b) a permanent data storage accessible only through said processor, said permanent data storage storing an identity private key for performing said second data transformation according to said first public/private key encryption algorithm;
   comparing said source test data with the resultant test data to verify the identity of said digital protection system; and
   using said attribute data to access one or more television channels on behalf of said subscriber depending on the results of said verifying step and said comparing step.

2. The method for providing television service of claim 1, wherein said attribute data comprises keys for accessing a plurality of channel signals.

3. The method for providing television service of claim 2, wherein said keys for accessing a plurality of channel signals are encrypted.

4. The method for providing television service of claim 1, wherein said digital signature represents an encryption of data derived from said identity public key and said attribute data, said encryption being according to a second public/private key encryption algorithm using a signature private key, said verifying step comprising:
   decrypting said digital signature according to said second public/private key encryption algorithm using a signature public key; and
   comparing the decrypted digital signature to said data derived from said identity public key and said attribute data to verify said descriptor data.

5. The method for providing television service of claim 1, wherein said first data transformation is an encryption of said source test data and said second data transformation is a decryption of said source test data encrypted by said first data transformation, said first data transformation being performed before said second data transformation.

6. The method for providing television service of claim 1, wherein said second data transformation is an encryption of said source test data and said first data transformation is a decryption of said source test data encrypted by said second data transformation, said second data transformation being performed before said first data transformation.

7. A television receiving system, comprising:
   a digital controller controlling the operation of said television system;
   a television signal transmission interface coupled to said digital controller, said interface receiving televisions signals from an external source and transmitting television signals to a display apparatus;
   a digital protection system coupled to said digital controller, said digital protection system securely storing an identity private key, and said digital protection system performing a first data transformation according to a first public/private key encryption algorithm in response to a command from said digital controller;
   a data descriptor receivable via said television signal transmission interface and associated with said digital protection system, said descriptor data including an identity public key associated with said digital protection system for transforming data according to said first public/private key encryption algorithm, attribute data identifying television broadcasts which a user of said television receiving system is entitled to receive, and a digital signature of said descriptor data by an entity authorizing the user to receive the television broadcasts identified by said attribute data;
   wherein said digital controller:
      (a) directs said digital protection system to perform said first data transformation of test data;
      (b) performs a second data transformation of test data according to said first public/private key encryption algorithm using said identity public key;
      (c) compares test data before transformation with test data after said first and said second transformation,
      (d) verifies, using said digital signature, said identity public key and said attribute data in said data descriptor; and
      (e) uses said attribute data to access television channels on behalf of said user responsive to the results of steps (c) and (d).

8. The television receiving system of claim 7, wherein said television signal transmission interface receives television signals from a satellite receiver.

9. The television receiving system of claim 7, wherein said attribute data comprises keys for accessing a plurality of channel signals.

10. The television receiving system of claim 9, wherein said keys for accessing a plurality of channel signals are encrypted.

11. The television receiving system of claim 7, wherein said digital signature represents an encryption of data derived from said identity public key and said attribute data, said encryption being according to a second public/private key encryption algorithm using a signature private key, said verifying step comprising:
   decrypting said digital signature according to said second public/private key encryption algorithm using a signature public key; and
   comparing the decrypted digital signature to said data derived from said identity public key and said attribute data to verify said descriptor data.

12. The television receiving system of claim 7, wherein said first data transformation is an encryption of said test data and said second data transformation is a decryption of said test data encrypted by said first data transformation, said first data transformation being performed before said second data transformation.

13. The television receiving system of claim 7, wherein said second data transformation is an encryption of said test data and said first data transformation is a decryption of said test data encrypted by said second data transformation, said second data transformation being performed before said first data transformation.

14. The television receiving system of claim 7, wherein said digital protection system comprises:
   (a) an external interface in communication with said digital controller;
   (b) an internal processor coupled to said external interface, said processor performing said first data transformation; and
   (c) an internal data storage storing said identity private key, said identity private key being inaccessible outside said external interface to said digital protection system.

15. The television receiving system of claim 14, wherein said digital protection system is implemented on a single integrated circuit chip separate from said digital controller.

16. A program product for controlling the operation of a television receiving apparatus, said program product comprising a plurality of executable instructions tangibly recorded on a non-transitory computer-readable medium, wherein said instructions cause the television receiving apparatus to perform the steps of:
   receiving descriptor data transmitted over an unsecure medium in said television receiving apparatus, said descriptor data including an identity public key associated with a digital protection system of said television receiving apparatus for transforming data according to a first public/private key encryption algorithm, attribute data identifying television broadcasts which a subscriber is entitled to receive, and a digital signature of said descriptor data by an entity authorizing the subscriber to receive the television broadcasts identified by said attribute data;
   verifying that said identity public key and said attribute data in said descriptor data has have not been altered using said digital signature;
   performing a first data transformation of a pair of data transformations of source test data, said pair of data transformations producing resultant test data, said first data transformation being according to said first public/private key encryption algorithm using said identity public key;
   requesting said digital protection system of said television receiving apparatus to perform a second data transformation of said pair of data transformations of said source test data, said digital protection system including
   (a) a processor capable of performing said second data transformation according to a said first public/private key encryption algorithm; and
   (b) a permanent data storage accessible only through said processor, said permanent data storage storing an identity private key for performing said second data transformation according to said first public/private key encryption algorithm;
   comparing said source test data with the resultant test data to verify the identity of said digital protection system; and
   using said attribute data to access one or more television channels on behalf of said subscriber depending on the results of said verifying step and said comparing step.

17. The program product of claim 16, wherein said attribute data comprises keys for accessing a plurality of channel signals.

18. The program product of claim 16, wherein said digital signature represents an encryption of data derived from said identity public key and said attribute data, said encryption being according to a second public/private key encryption algorithm using a signature private key, said verifying step comprising:
   decrypting said digital signature according to said second public/private key encryption algorithm using a signature public key; and
   comparing the decrypted digital signature to said data derived from said identity public key and said attribute data to verify said descriptor data.

* * * * *